(12) United States Patent
Aizawa et al.

(10) Patent No.: US 8,997,815 B2
(45) Date of Patent: Apr. 7, 2015

(54) ULTRASONIC BONDING APPARATUS

(71) Applicants: Kabushiki Kaisha Toshiba, Minato-ku (JP); Shibaura Mechatronics Corporation, Yokohama-shi (JP)

(72) Inventors: Takahiro Aizawa, Yokohama (JP); Noboru Kuriyama, Yokohama (JP); Miki Mori, Yokohama (JP)

(73) Assignees: Kabushiki Kaisha Toshiba, Minato-ku (JP); Shibaura Mechatronics Corporation, Yokohama-shi (JP)

( * ) Notice: Subject to any disclaimer, the term of this patent is extended or adjusted under 35 U.S.C. 154(b) by 0 days.

(21) Appl. No.: 14/206,562

(22) Filed: Mar. 12, 2014

(65) Prior Publication Data

US 2014/0283996 A1    Sep. 25, 2014

(30) Foreign Application Priority Data

Mar. 19, 2013 (JP) .................. 2013-057284

(51) Int. Cl.
| B32B 37/00 | (2006.01) |
| B23K 20/10 | (2006.01) |
| B06B 1/02 | (2006.01) |
| B29C 65/08 | (2006.01) |
| B06B 3/00 | (2006.01) |

(52) U.S. Cl.
CPC ............. *B23K 20/10* (2013.01); *B29C 65/08* (2013.01); *B06B 1/0253* (2013.01); *B06B 3/00* (2013.01)

(58) Field of Classification Search
USPC ............ 156/64, 73.1, 359, 580.1, 580.2; 228/110.1, 1.1; 310/323.01, 323.18
See application file for complete search history.

(56) References Cited

U.S. PATENT DOCUMENTS

| 5,435,863 | A | * | 7/1995 | Frantz | 156/64 |
| 5,855,706 | A | * | 1/1999 | Grewell | 156/64 |
| 7,208,059 | B2 | * | 4/2007 | Matsumura et al. | 156/64 |
| 7,771,551 | B2 | * | 8/2010 | Schroeder | 156/64 |
| 8,702,883 | B2 | * | 4/2014 | Herrmann et al. | 156/64 |
| 8,858,742 | B2 | * | 10/2014 | Spicer et al. | 156/64 |

FOREIGN PATENT DOCUMENTS

JP    8-191087    7/1996

* cited by examiner

*Primary Examiner* — James Sells
(74) *Attorney, Agent, or Firm* — Oblon, McClelland, Maier & Neustadt, L.L.P.

(57) ABSTRACT

According to one embodiment, an ultrasonic bonding apparatus includes an ultrasonic transducer, a distal-end tool, an ultrasonic horn and an ultrasonic oscillator. The ultrasonic oscillator includes an oscillation circuit and a control device. The ultrasonic oscillator applies the voltage oscillated by the oscillation circuit to the ultrasonic transducer. The control device is configured to detect a voltage reflection ratio from the voltage and current supplied from the oscillation circuit and to control the frequency of the voltage generated by the oscillation circuit, thereby to minimize the voltage reflection ratio.

3 Claims, 6 Drawing Sheets

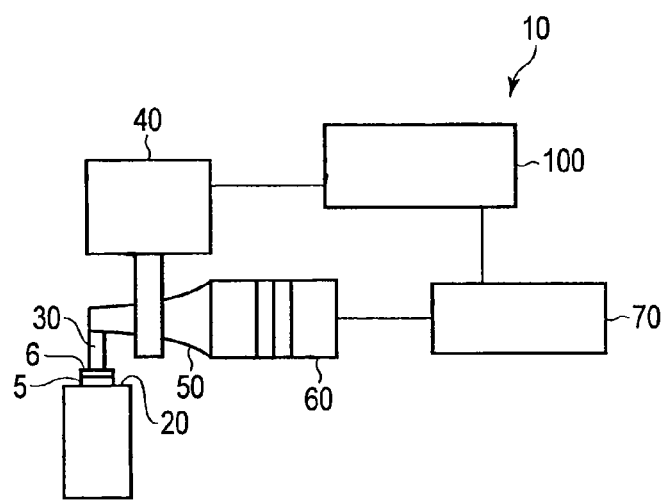
F I G. 1
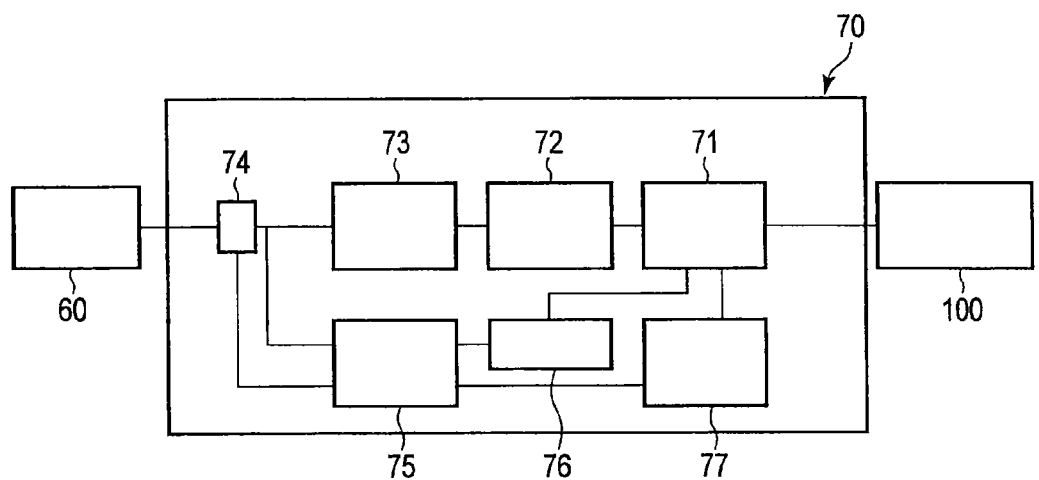
F I G. 2

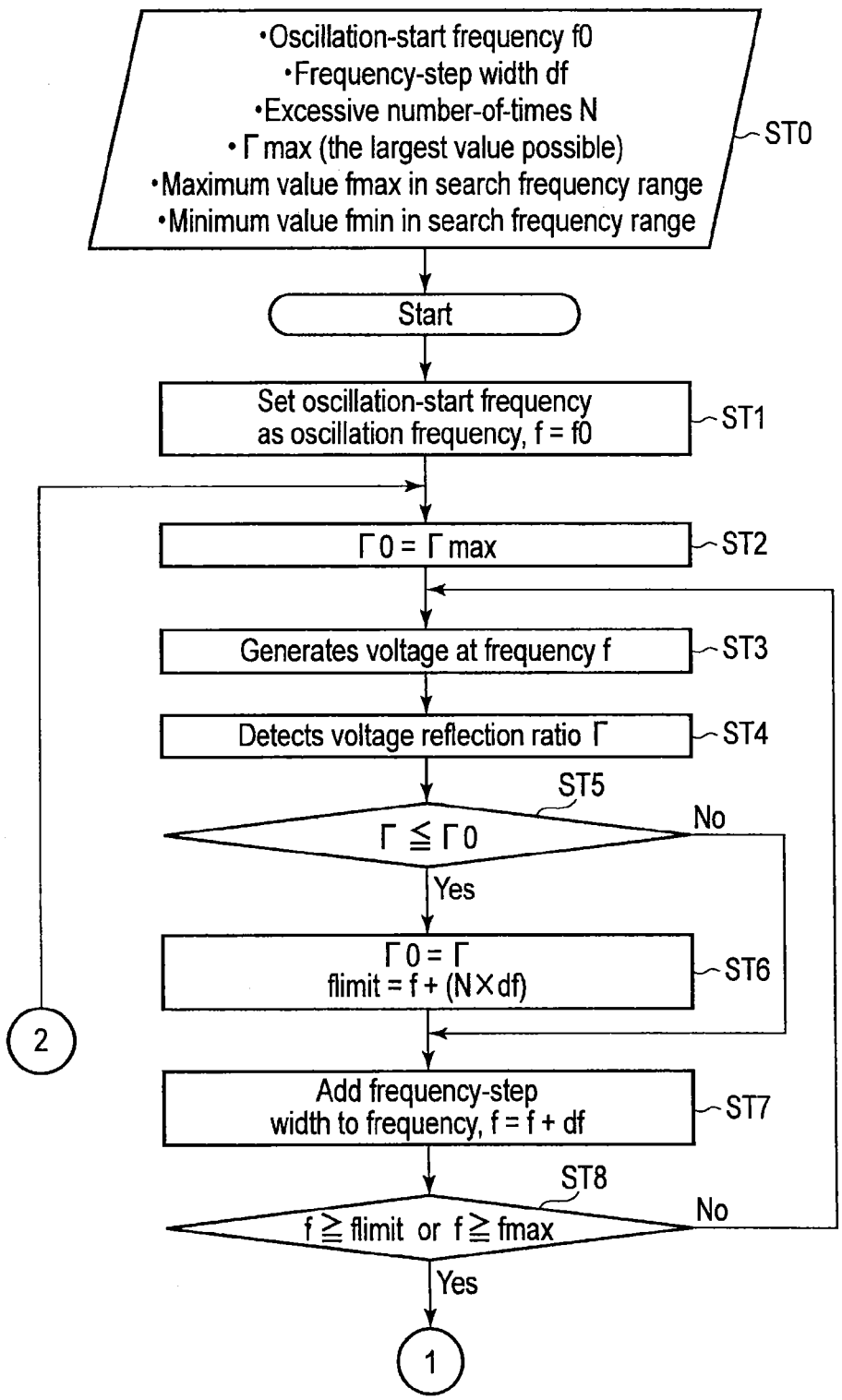
F I G. 3A

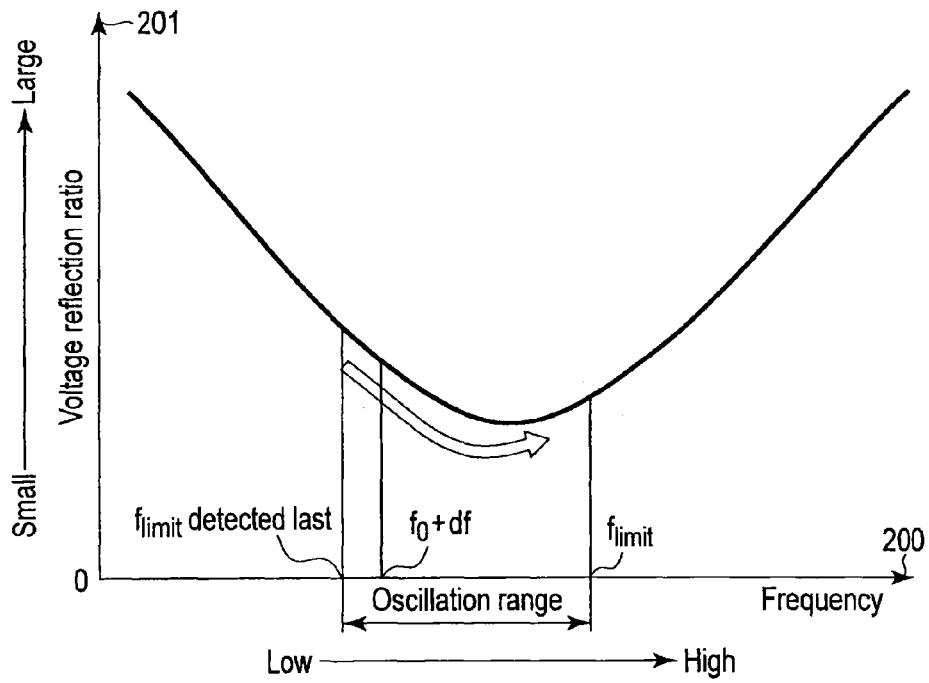
F I G. 4
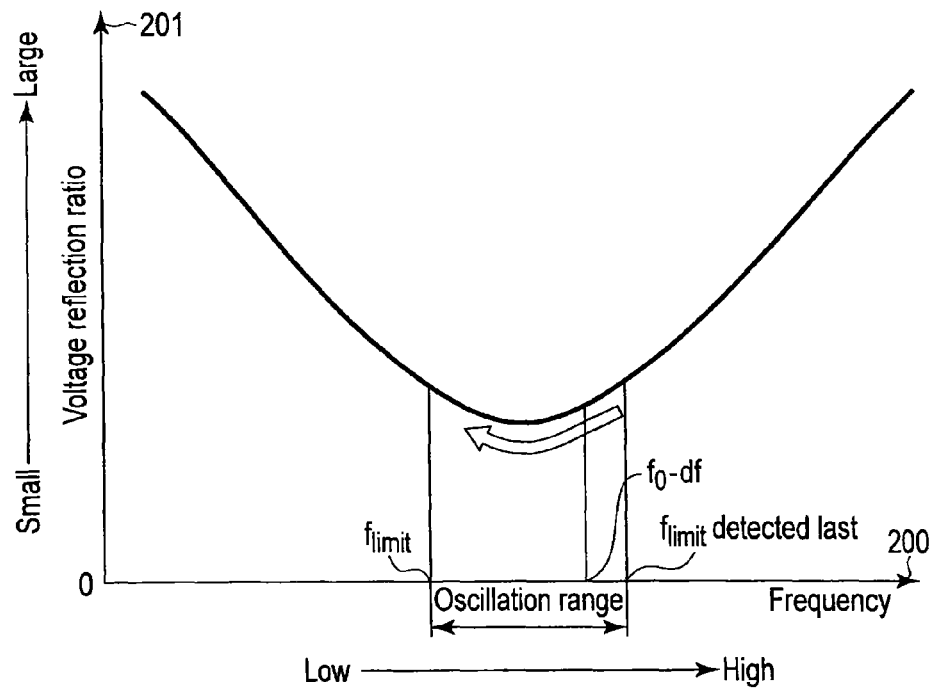
F I G. 5

ULTRASONIC BONDING APPARATUS

CROSS-REFERENCE TO RELATED APPLICATION

This application is based upon and claims the benefit of priority from Japanese Patent Application No. 2013-057284, filed Mar. 19 2013; the entire contents of which are incorporated herein by reference.

FIELD

Embodiments described herein relate generally to an ultrasonic bonding apparatus that applies a pressure and ultrasonic vibration to work pieces to bond the work pieces together.

BACKGROUND

Ultrasonic bonding apparatuses designed to apply a pressure and ultrasonic vibration to work pieces, thereby to bond the work pieces together, has a distal-end tool, an ultrasonic horn, an ultrasonic transducer, and an ultrasonic oscillator. The distal-end tool applies vibration and pressure to the work pieces. The ultrasonic horn transmits vibration and pressure to the distal-end tool. The ultrasonic transducer mechanically vibrates the ultrasonic horn. The ultrasonic oscillator supplies drive power to the ultrasonic transducer.

In any ultrasonic bonding apparatus of this type, the ultrasonic oscillator undergoes a frequency-tracking control using a phase locked loop (PLL) oscillation circuit.

BRIEF DESCRIPTION OF THE DRAWINGS

FIG. 1 is a block diagram showing an ultrasonic bonding apparatus according to a first embodiment;

FIG. 2 is a block diagram showing a ultrasonic oscillator incorporated in the ultrasonic bonding apparatus;

FIG. 3A is a flowchart showing how the ultrasonic oscillator operates;

FIG. 4 is a graph showing the relation between the frequency and reflection ratio of the voltage applied from the ultrasonic oscillator controlled to reduce the voltage reflection ratio to the minimum;

FIG. 5 is a graph showing the relation between the frequency and reflection ratio of the voltage applied from the ultrasonic oscillator controlled to reduce the voltage reflection ratio to the minimum;

DETAILED DESCRIPTION

Figure 3B:
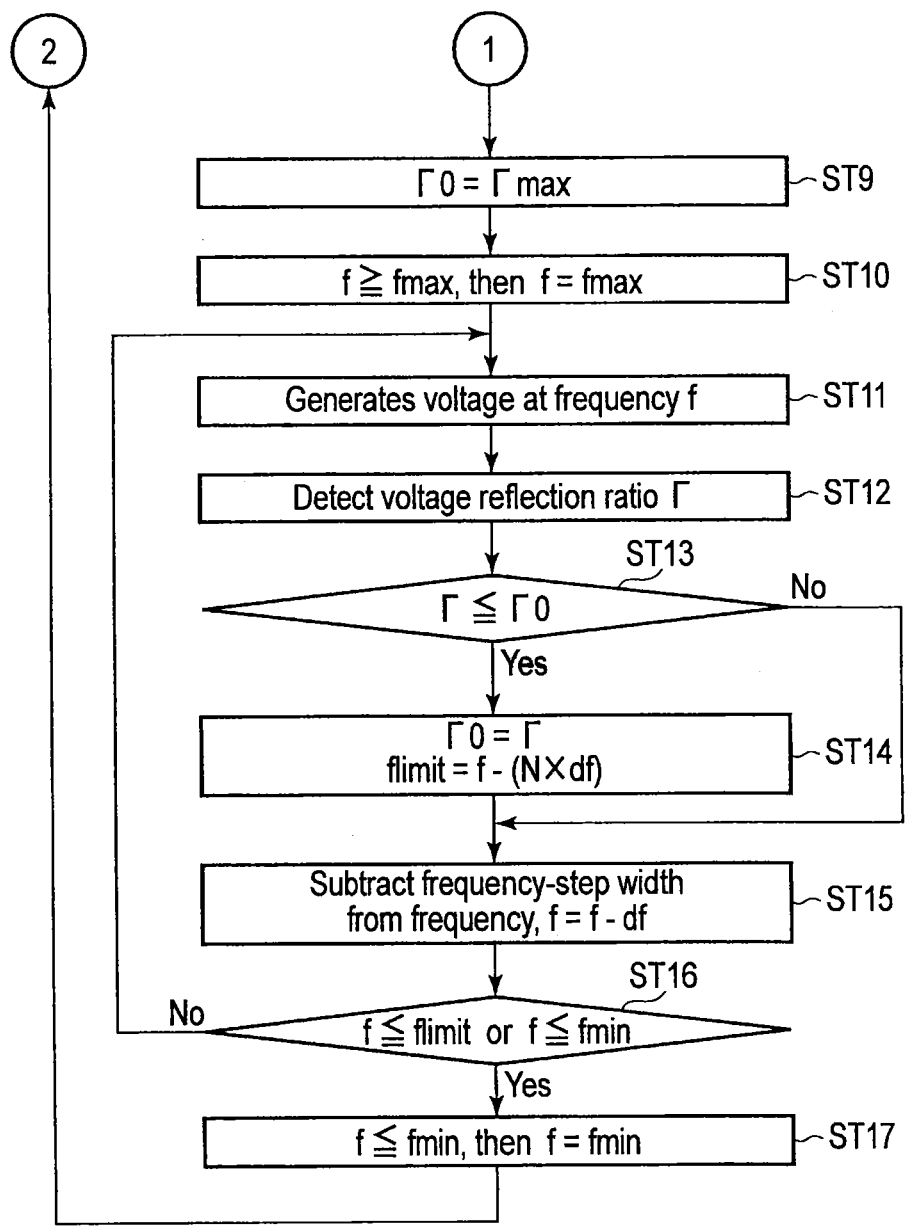
FIG. 3B is a flowchart showing how the ultrasonic oscillator operates.

According to one embodiment, an ultrasonic bonding apparatus includes an ultrasonic transducer, a distal-end tool, an ultrasonic horn and an ultrasonic oscillator. The ultrasonic transducer is configured to generate ultrasonic vibration as the ultrasonic transducer receives a voltage. The distal-end tool is configured to apply a pressure and the ultrasonic vibration to work pieces to be bonded together. The ultrasonic horn is configured to transmit the pressure and the ultrasonic vibration from the ultrasonic transducer to the distal-end tool. The ultrasonic oscillator includes an oscillation circuit and a control device. The ultrasonic oscillator applies the voltage oscillated by the oscillation circuit to the ultrasonic transducer. The control device is configured to detect a voltage reflection ratio from the voltage and current supplied from the oscillation circuit and to control the frequency of the voltage generated by the oscillation circuit, thereby to minimize the voltage reflection ratio.

An ultrasonic bonding apparatus 10 according to a first embodiment will be described with reference to FIGS. 1 to 5. FIG. 1 is a schematic diagram showing the ultrasonic bonding apparatus 10. As seen from FIG. 1, the ultrasonic bonding apparatus 10 is designed to bond work pieces. For example, the ultrasonic bonding apparatus 10 bonds a first work piece 5 and a second work piece 6. The number of work pieces to bond is not limited to two. The ultrasonic bonding apparatus 10 can bond two or more work pieces to one another.

The ultrasonic bonding apparatus 10 has a bonding stage 20, a distal-end tool 30, a pressure device 40, an ultrasonic horn 50, an ultrasonic transducer 60, an ultrasonic oscillator 70, and a control circuit unit 100. The first work piece 5 and the second work piece 6 are mounted on the bonding stage 20.

The distal-end tool 30 can hold the first work piece 5 and the second work piece 6 together, between it and the bonding stage 20. The first work piece 5 and the second work piece 6 lie, one on the other, while clamped between the bonding stage 20 and the distal-end tool 30.

The ultrasonic horn 50 is coupled to the distal-end tool 30, and transmits the vibration from the ultrasonic transducer 60 to the distal-end tool 30. The pressure device 40 is coupled to the ultrasonic horn 50, and can apply a pressure to the ultrasonic horn 50. As the pressure device 40 applies a pressure to the ultrasonic horn 50, the distal-end tool 30, which is coupled to the ultrasonic horn 50, is pushed toward the bonding stage 20. As a result, a pressure and vibration are applied to the first work piece 5 and second work piece 6, both clamped between the distal-end tool 30 and the bonding stage 20. The ultrasonic transducer 60 has a piezoelectric element. The ultrasonic transducer 60 therefor vibrates as the ultrasonic oscillator 70 applies a voltage to it.

The ultrasonic oscillator 70 applies a voltage to the ultrasonic transducer 60. FIG. 2 is a block diagram showing the configuration of the ultrasonic oscillator 70. As shown in FIG. 2, the ultrasonic oscillator 70 has an oscillation circuit 71, a power amplifier 72, an output transformer 73, a current detector 74, a signal converter 75, an amplifier 76, and an operation device 77.

The oscillation circuit 71 receives a signal from the control circuit unit 100 (described later in detail), and generates electric power. The electric power is supplied via the power amplifier 72 and output transformer 73 to the ultrasonic transducer 60. On the power transmission path extending between the output transformer 73 and the ultrasonic transducer 60, the current detector 74 is provided. The current detector 74 detects the current flowing in the ultrasonic transducer 60.

The current value detected by the current detector 74 is transmitted to the signal converter 75. The power transmitting path extending between the output transformer 73 and the ultrasonic transducer 60 is connected to the signal converter 75. Thus, the voltage applied to the ultrasonic transducer 60 is input to the signal converter 75.

The signal converter 75 computes the power to input to the ultrasonic transducer 60, from the current value detected by the current detector 74 and the voltage applied as described above. The signal converter 75 then computes, from the powers so computed, the power the oscillation circuit 71 should output. The information about the power to output from the oscillation circuit 71, or an output control signal, is transmitted via the amplifier 76 to the oscillation circuit 71. The signal converter 75 transmits the information representing the voltage applied to the ultrasonic transducer 60 and current value detected by the current detector 74, to the operation device 77.

The operation device 77 calculates a voltage reflection ratio Γ on the basis of the information transmitted from the signal converter 75 and representing the voltage value and current value. The voltage reflection ratio Γ will be explained. The ultrasonic transducer 60 generates vibration proportional to the voltage applied to it. The vibration generated is transmitted to the first work piece 5 and the second work piece 6 to bond the first work piece 5 and second work piece 6 to each other. Part of the vibration is not used to bond the work pieces 5 and 6 together, and is applied back to the ultrasonic transducer 60. The ultrasonic transducer 60 converts this part of the vibration to a voltage. This voltage is synthesized with the voltage output from the output transformer 73, generating a synthesized voltage. The synthesized voltage is applied to the signal converter 75. Therefore, the voltage reflection ratio Γ is the ratio of the voltage applied back to the ultrasonic transducer 60 to the voltage applied from the ultrasonic oscillator 70 to the ultrasonic transducer 60.

The operation device 77 generates a control signal for controlling the frequency of the voltage output from the oscillation circuit 71, thereby to minimize the voltage reflection ratio Γ. The control signal is supplied to the oscillation circuit 71. The oscillation circuit 71 oscillates at the frequency designated by the control signal transmitted from the operation device 77.

As described above, the oscillation circuit 71 outputs power on the basis of the output control signal input from the amplifier 76 and the representing the oscillation frequency input from the operation device 77.

The control circuit unit 100 controls the pressure device 40, and controls the oscillation circuit 71, causing the oscillation circuit 71 to start and end operating.

How the ultrasonic bonding apparatus 10 operates will be explained. If both work pieces 5 and 6 are not mounted on the bonding stage 20, the pressure device 40 is never driven. In this case, the distal-end tool 30 remains spaced apart from the bonding stage 20.

A supplying means (not shown) may place the first work piece 5 and the second work piece 6 on the bonding stage 20. At this point, the work pieces 5 and 6 assume postures in which they should be bonded to each other.

Once the first work piece 5 and second work piece 6 have been so placed on the bonding stage 20, the control circuit unit 100 applies a pressure to the pressure device 40. The ultrasonic horn 50 is thereby pressed toward the bonding stage 20. The distal-end tool 30 coupled to the ultrasonic horn 50 therefore moves toward the bonding stage 20. Eventually, the first work piece 5 and second work piece 6 are clamped between the bonding stage 20 and the distal-end tool 30, and applied with a pressure.

The control circuit unit 100 holds the information about the pressure that should be applied to bond the first work piece 5 and second work piece 6 together. On the basis of this information, the control circuit unit controls the pressure device 40. If a prescribed pressure is applied to the first work piece 5 and second work piece 6, the control circuit unit 100 starts operating to drive the oscillation circuit 71.

FIGS. 3A and 3B are a flowchart showing how the ultrasonic oscillator 70 operates. More specifically, FIG. 3A shows how the control circuit unit 100 operates before the ultrasonic oscillator 70 starts operating. As shown in FIG. 3A, in Step ST0 the control circuit unit 100 sets oscillation-start frequency f0, frequency-step width df, excessive number-of-times N, maximum value fmax in a search frequency range, minimum value fmin in the search frequency range, and maximum value Γmax. The maximum value Γmax is a maximum possible value of the voltage-reflection ratio Γ. The information representing the items set is input to the control circuit unit 100 by, for example, the operator of the ultrasonic bonding apparatus 10.

The oscillation-start frequency f0 is determined in advance. The oscillation-start frequency f0 so preset is a value between the minimum value fmin in the search frequency range and the maximum value fmax in the search frequency range. The maximum value fmax in the search frequency range is the highest frequency that the output voltage the oscillation circuit 71 generated can have. The value, which is predetermined, is a characteristic value of the oscillation circuit 71. The minimum value fmin in the search frequency range fmin is the lowest frequency the output voltage the oscillation circuit 71 generated can have. The value, which is predetermined, is a characteristic value of the oscillation circuit 71.

The maximum value Γmax of the voltage-reflection ratio is theoretically 1. This is because the maximum value the voltage reflected and applied back to the ultrasonic transducer 60 has the same value as the voltage input from the ultrasonic oscillator 70 to the ultrasonic transducer 60. The maximum value Γmax of the voltage-reflection ratio may, however, become less than 1 because of the friction occurring due to the configuration of the ultrasonic bonding apparatus 10. The maximum value Γmax of the voltage-reflection ratio can be obtained beforehand, for example, through experiments.

If the control circuit unit 100 transmits a drive start signal, the operation goes to Step ST1. In Step ST1, the operation device 77 sets the oscillation-start frequency f0 as oscillation frequency f. The operation then proceeds to Step ST2. In Step ST2, the operation device 77 stores the maximum value Γmax of the voltage-reflection ratio as comparison variable Γ0, which will be compared with the voltage-reflection ratio Γ. The operation further proceeds to Step ST3.

In Step ST3, the oscillation circuit 71 generates voltage at oscillation-start frequency f0. The operation then goes to Step ST4. In Step ST4, the operation device 77 detects the voltage reflection ratio Γ.

Next, the operation goes to Step ST5. In Step ST5, the operation device 77 compares the voltage reflection ratio Γ detected in Step ST4 with the comparison variable Γ0. If the voltage reflection ratio Γ is equal to or smaller than the comparison variable Γ0, the operation goes to Step ST6.

In Step ST6, the voltage reflection ratio Γ detected in Step ST4 is stored as comparison variable Γ0. Also in Step ST6, search target value flimit is set, which is the sum of the oscillation frequency f set in Step ST1 and the product of the frequency-step width df and excessive number-of-times N. That is, flimit=f+(N×df), where N>1. The search target value flimit is a transition value at which the frequency of the voltage output from the oscillation circuit 71 starts decreasing or increasing. Thus, if the frequency of the voltage output from the oscillation circuit 71 has been increasing, it starts decreasing when it reaches the search target value flimit. If the frequency of the voltage output from the oscillation circuit 71 has been decreasing, it starts increasing when it reaches the search target value flimit.

The frequency-step width df and the excessive number-of-times N will be explained. The frequency-step width df is a value by which the oscillation frequency is changed each time, or is the difference between any two consecutive oscillation frequencies. Hence, when the oscillation frequency is increased, the oscillation frequency is increased by frequency-step width df from the value it had immediately before. When the oscillation frequency is decreased, the oscillation frequency is decreased by frequency-step width df from the value it had immediately before. The excessive number-of-times N is the number of times the frequency-step width df is increased or decreased.

The search target value flimit is updated if the voltage reflection ratio $\Gamma$ is found equal to or smaller than the comparison variable $\Gamma 0$ in Step ST5. Then, the operation proceeds to Step ST7.

In Step ST5, the voltage reflection ratio $\Gamma$ may be found larger than the comparison variable $\Gamma 0$. Then, the operation proceeds to Step ST7. That is, if the voltage reflection ratio $\Gamma$ is larger than the comparison variable $\Gamma 0$, the search target value flimit is maintained at the previous value. In Step ST7, the frequency-step width df is added to the oscillation-start frequency f0 set in Step ST1. Thus, f=f+df. The operation then goes to Step ST8.

In Step ST8, the next oscillation frequency f set in Step ST7 may be neither equal to, nor higher than, the search target value flimit, or may be neither equal to, nor higher than the maximum search frequency fmax. In this case, the operation returns to Step ST3.

The next oscillation frequency f set in Step ST7 may not be equal to or higher than the search target value flimit. In other words, the next oscillation frequency f may be smaller than the search target value flimit. In this case, the oscillation frequency will keep increasing.

The next oscillation frequency f set in Step ST7 may not be equal to or higher than the maximum value fmax. In other words, the next oscillation frequency f may be lower than maximum search frequency fmax. In this case, the oscillation circuit 71 is considered able to operate. Thus, although the next oscillation frequency keeps increasing, it remains lower than the frequency at which the oscillation circuit 71 can operates. Steps ST3 to ST8 are therefore repeated.

When the operation thus returns from Step ST8 to Step ST3, the operation device 77 transmits a frequency control signal to the oscillation circuit 71, to cause the same to generate voltage at the frequency set in Step ST7. The oscillation circuit 71 generates voltage at the frequency designated by the frequency control signal transmitted from the operation device 77.

In Step ST8, the oscillation frequency f set in Step ST7 may be found equal to or higher than the search target value flimit, or equal to or higher than the maximum value fmax. In this case, the operation goes to Step ST9. Step ST9 and the steps following Step ST9 are shown in FIG. 3B. As shown in FIG. 3B, the maximum value $\Gamma$max of the voltage-reflection ratio is stored as comparison variable $\Gamma 0$. Then, the operation goes to Step ST10.

In Step ST10, the oscillation frequency f set in Step ST7 may be found equal to or higher than the maximum value fmax. In this case, the oscillation frequency f is set to the maximum value fmax. Thus, f=fmax. This is because the oscillation circuit 71 cannot perform oscillation if the oscillation frequency f is higher than the maximum value fmax. If the oscillation frequency f set in Step ST7 is lower than the maximum value fmax, the oscillation frequency is maintained at the value set in Step ST7. Then, the operation goes to Step ST11.

In Step ST11, the operation device 77 transmits a frequency control signal to the oscillation circuit 71 so that the oscillation circuit 71 may generate the voltage of the frequency set in Step ST7 or Step ST10. The oscillation circuit 71 generates voltage at the frequency of the frequency control signal transmitted from the operation device 77. The operation then goes to Step ST12.

In Step ST12, the operation device 77 detects the voltage reflection ratio $\Gamma$ for the voltage generated by the oscillation circuit 71 in Step ST11, and stores the voltage reflection ratio $\Gamma$. Next, the operation goes to Step ST13. In Step ST13, the operation device 77 compares the voltage reflection ratio $\Gamma$ detected in Step ST12 with the comparison variable $\Gamma 0$. If the voltage reflection ratio $\Gamma$ is equal to or lower than the comparison variable $\Gamma 0$, the operation goes to Step ST14.

In Step ST14, the operation device 77 stores the voltage reflection ratio $\Gamma$ detected in Step 12 as comparison variable $\Gamma 0$. That is, $\Gamma 0 = \Gamma$. Also in Step ST14, the search target value flimit is updated to the value obtained by subtracting from the oscillation frequency f, the product of the frequency-step width df and excessive number-of-times N. Thus, flimit=f−(N×df). The operation then goes to Step ST13. In Step ST13, the voltage reflection ratio $\Gamma$ may be found larger than the voltage reflection ratio $\Gamma$. In this case, too, the operation goes to Step ST15.

In Step ST15, the oscillation frequency f is updated or decreased by frequency-step width df. That is, f=f−df. The operation then goes to Step ST16. In Step ST16, the operation device 77 determines whether the oscillation frequency f updated in Step ST15 is equal to or lower than the search target value flimit, or whether the operation frequency f is equal to or lower than the minimum value fmin. That is, the operation device 77 determines f≦flimit or f≦fmin. Unless f≦flimit or f≦fmin, the operation returns to Step ST11. If f≦flimit or f≦fmin, the operation goes to Step ST17. If the operation returns to Step ST11, the oscillation circuit 71 generates voltage at the frequency set in Step ST15.

In Step ST17, the oscillation frequency f is set to the minimum value fmin if the oscillation frequency set in step ST15 has been found equal to or lower than the minimum value fmin. Thus, f=fmin. This is because the oscillation circuit 71 generates no voltage if the oscillation frequency f set in Step ST15 is lower than the minimum value fmin. If the oscillation frequency f set in Step ST15 is higher than the minimum value fmin, the oscillation frequency will be maintained at the value set in Step ST15, and the operation returns from Step ST17 to Step ST2.

FIGS. 4 and 5 are a graph showing the relation the voltage frequency with the voltage reflection ratio $\Gamma$ when the oscillation circuit 71 is controlled to reduce the voltage reflection ratio $\Gamma$ to the minimum. FIG. 4 shows the voltage frequency changes with the voltage reflection ratio $\Gamma$ as Steps ST1 to ST8 are performed. As seen from FIG. 4, the voltage reflection ratio $\Gamma$ is detected as the oscillation frequency f is increased, each time by frequency-step width df. FIG. 5 shows the voltage frequency changes with the voltage reflection ratio $\Gamma$ as Steps ST9 to ST17 are performed. As seen from FIG. 5, the voltage reflection ratio $\Gamma$ is detected as the oscillation frequency f is decreased each time by frequency-step width df. In FIGS. 4 and 5, the frequency is plotted on the horizontal axis, and increases in the direction of arrow 200. That is, the frequency increases toward the right side in FIGS. 4 and 5. In FIGS. 4 and 5, the voltage reflection ratio $\Gamma$ is plotted on the vertical axis, and increases in the direction of arrow 201. That is, the voltage reflection ratio $\Gamma$ increases toward the upper side in FIGS. 4 and 5.

As the operation device 77 operates as shown in FIG. 3A, the ultrasonic oscillator 70 keeps increasing the oscillation frequency f each time by frequency-step width df, until the voltage reflection ratio $\Gamma$ becomes minimal. When the voltage reflection ratio $\Gamma$ becomes minimal, the ultrasonic oscillator 70 further increases the oscillation frequency up to the search target value flimit. Once the voltage reflection ratio Γ has reached the minimum value, it starts increasing. While the voltage reflection ratio Γ is increasing, the search target value flimit set when the voltage reflection ratio Γ was minimal remains not updated. Therefore, when the oscillation frequency f comes to have the search target value flimit, it is lowered by frequency-step width df as shown in FIG. 5. As a result, the voltage reflection ratio Γ again reaches the minimum value. If the voltage reflection ratio Γ does not decrease from the value detected last time, the search target value flimit is not updated from the value set when the voltage reflection ratio Γ was minimal. The oscillation frequency therefore increases again by frequency-step width df when it reaches the search target value set at the time the voltage reflection ratio Γ was minimal.

The frequency of the voltage the ultrasonic oscillator 70 generates thus changes repeatedly as shown in FIGS. 4 and 5. Even after the peak (minimum value) of the voltage reflection ratio Γ is detected, the oscillation frequency f increases or decreases each time by frequency-step width df by the excessive number N. It can therefore be determined whether the peak of the voltage reflection ratio Γ is the minimum value or not.

In this embodiment, the frequency of the voltage applied from the oscillation circuit 71 is controlled to minimize the voltage reflection ratio Γ. The smaller the voltage reflection ratio Γ, the more efficiently the voltage output from the oscillation circuit 71 is used to bond the first work piece 5 and second work piece 6.

Thus, the ultrasonic oscillator 70 undergoes not only the control based on the phase difference, such as the frequency-tracking control using a phase locked loop (PLL) oscillation circuit, but also the control based on the actual state of bonding the work pieces 5 and 6. This can increase the oscillation efficiency of the ultrasonic oscillator 70. The term of "oscillation efficiency" used here means the ratio of the voltage used to bond the first work piece 5 and second work piece 6 to the voltage output from the ultrasonic oscillator 70.

As described above, the present voltage reflection ratio Γ is compared with the ratio Γ detected last, and the search target value is updated if the voltage reflection ratio Γ is smaller than the ratio Γ detected last. The oscillation frequency is thereby updated, and the voltage reflection ratio Γ is continuously detected. The minimum value of the oscillation frequency can therefore be reliably detected. Thus, the ultrasonic oscillator 70 can keep generating voltage at a voltage reflection ratio Γ that is close to the minimum value.

The voltage reflection ratio Γ may be equal to or larger than the voltage reflection ratio Γ detected last. If this is the case, the oscillation frequency cannot be increased or decreased continuously, since the search target value is not updated at all. Hence, the voltage reflection ratio Γ at a value close to the minimum value can be detected.

An ultrasonic bonding apparatus according to the second embodiment will be described with reference to FIGS. 6A and 6B. The components is same or similar in function to those of the first embodiment are designated by the same reference numbers and will not be described. In the second embodiment, the control circuit unit 100 and the operation device 77 differ in terms of operation from their equivalents of the first embodiment. The ultrasonic bonding apparatus 10 is identical in configuration to its equivalent of the first embodiment. Only the features of the second embodiment that differ from those of the first embodiment will be described.

Figure 6A:
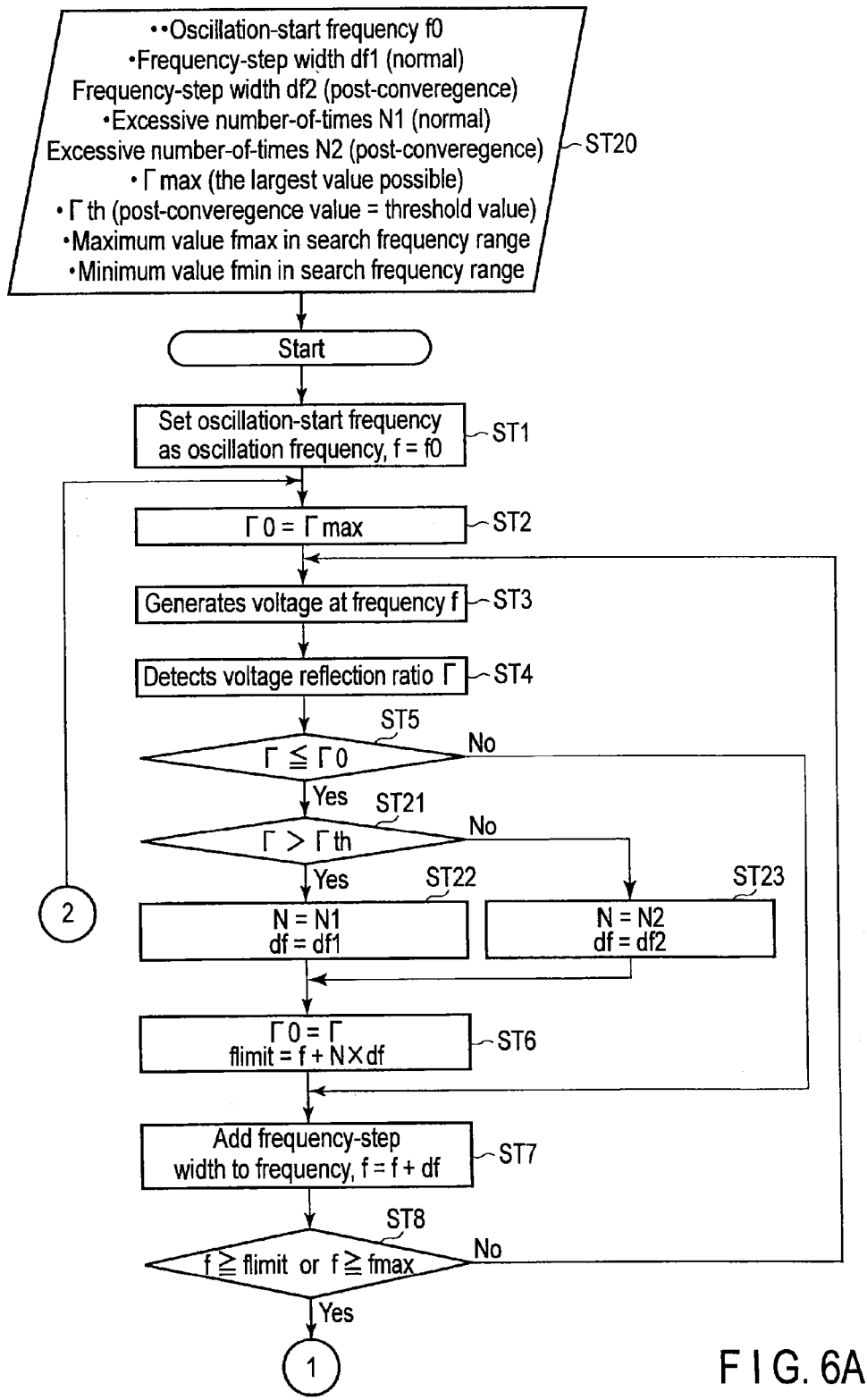
FIG. 6A is a flowchart showing how the ultrasonic oscillator operates in an ultrasonic bonding apparatus according to the second embodiment.
Figure 6B:
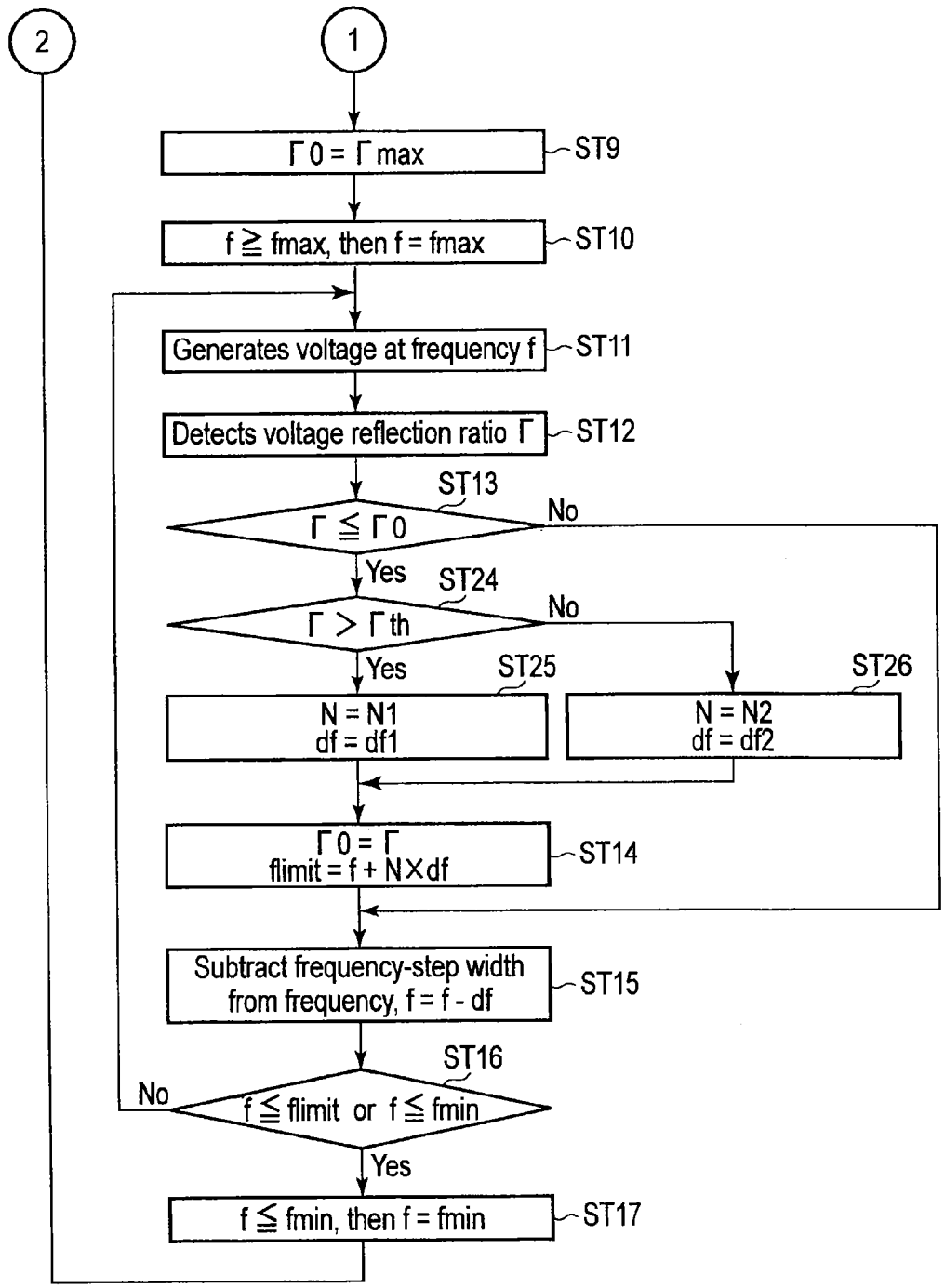
FIG. 6B is a flowchart showing how the ultrasonic oscillator operates in the ultrasonic bonding apparatus according to the second embodiment.

FIGS. 6A and 6B are a flowchart showing how the ultrasonic oscillator 70 operates in the ultrasonic bonding apparatus according to the second embodiment. More specifically, FIG. 6A shows Steps ST1 to ST8, and FIG. 6B shows Steps ST9 to ST17. As shown in FIG. 6A, Step ST20 is performed, instead of Step ST0 performed in the first embodiment. As shown in FIG. 6A, Steps ST21, ST22 and ST23 are performed between Step ST5 and Step ST6. As shown in FIG. 6B, Steps ST24, ST25 and ST26 are performed between Step ST13 and Step ST14.

The voltage reflection ratio Γ changes with the bonded state of the first work piece 5 and second work piece 6. That is, if a voltage having a specific frequency is output from the ultrasonic oscillator 70, the voltage reflection ratio Γ with respect to the specific frequency changes with the bonded state of the first and second work pieces 5 and 6. As the first work piece 5 and second work piece 6 are bonded more firmly, the voltage reflection ratio Γ decreases toward a particular value. In the second embodiment, the voltage reflection ratio Γ is compared with a threshold value Γth, and the bonded state of the first and second work pieces 5 and 6 is determined from the difference between the ratio Γ and the threshold value Γth. In accordance with the bonded state so determined, the excessive number-of-times N and the frequency-step width df are changed.

In Step ST20 shown in FIG. 6A, the operator of the ultrasonic bonding apparatus 10, for example, inputs various data items at the control circuit unit 100 as in the first embodiment. The control circuit unit 100 sets two frequency-step widths df1 and df2. The frequency-step width df1 is used if the voltage reflection ratio Γ is greater than the threshold value Γth. The frequency-step width df2 is used if the voltage reflection ratio Γ is equal to or smaller than the threshold value Γth.

Also in Step ST20, control circuit unit 100 sets two excessive number-of-times N1 and N2. The excessive number-of-times N1 is used if the voltage reflection ratio Γ is greater than the threshold value Γth. The excessive number-of-times N2 is used if the voltage reflection ratio Γ is equal to or smaller than the threshold value Γth.

The frequency-step widths df1 and df2 and the excessive number-of-times N1 and N2 have values, defining the relation of: (N1×df1)>(N2×df2), where N1>1 and N2>1. The frequency-step width df1 is, for example, equal to the frequency-step width df used in the first embodiment, and the excessive number-of-times N1 is, for example, equal to the excessive number-of-times N used in the first embodiment.

In Step ST20, the maximum value Γmax the voltage reflection ratio Γ can have, the above-mentioned threshold value Γth, the maximum value fmax in the search frequency range, and the minimum value fmin in the search frequency range are set, too. Γmax, fmax and fmin are identical values to those used in the first embodiment.

Steps ST21 to ST23 are performed by the operation device 77. The operation of the operation device 77 goes from Step ST5 to Step ST21. In Step ST21, the operation device 77 determines whether the voltage reflection ratio Γ is larger than the threshold value Γth. If the voltage reflection ratio Γ is larger than the threshold value Γth, it indicates that the first work piece 5 and second work piece 6 have yet to assume the prescribed bonded state. If the voltage reflection ratio Γ is equal to or smaller than the threshold value Γth, it indicates that the first work piece 5 and second work piece 6 have already assumed the prescribed bonded state.

If the voltage reflection ratio Γ is found larger than the threshold value Γth, the operation goes to Step ST22. If the voltage reflection ratio Γ is found equal to or smaller than the threshold value Γth, the operation goes to Step ST23. In Step S22, the excessive number-of-times N1 is selected, and the frequency-step width df1 is selected. In Step S23, the excessive number-of-times N2 is selected, and the frequency-step width df2 is selected. The operation then goes from Step ST22 or ST23 to Step ST6.

Steps ST24 to ST26 are performed by the operation device 77. The operation goes from Step ST13 to Step ST24. In Step ST24, the operation device 77 determines whether the voltage reflection ratio Γ is larger than the threshold value Γth. If the voltage reflection ratio Γ is larger than the threshold value Γth, it indicates that the first work piece 5 and second work piece 6 have yet to assume the prescribed bonded state. If the voltage reflection ratio Γ is equal to or smaller than the threshold value Γth, it indicates that the first work piece 5 and second work piece 6 have already assumed the prescribed bonded state.

If the voltage reflection ratio Γ is larger than the threshold value Γth, the operation goes to Step ST25. If the voltage reflection ratio Γ is equal to or smaller than the threshold value Γth, the operation goes to Step ST26. In Step ST25, the excessive number-of-times N1 is selected, and the frequency-step width df1 is selected. In Step S26, the excessive number-of-times N2 is selected, and the frequency-step width df2 is selected. The operation then goes from Step ST25 or ST26 to Step ST14.

Thus, if the voltage reflection ratio Γ is equal to or smaller than the threshold value Γth, or if the first work piece 5 and second work piece 6 have already assumed the prescribed bonded state, it is possible to narrow the frequency range that is too broad for the voltage generated when the peak of the voltage reflection ratio Γ is detected.

Once the first and second work pieces 5 and 6 have assumed the prescribed bonded state, the voltage reflection ratio Γ tends to change less. The voltage reflection ratio Γ therefore has almost the minimum value when its peak detected. Thus, by narrowing the frequency range, the ultrasonic oscillator 70 can efficiently generate a voltage at the voltage reflection ratio Γ close to the minimum value.

The search target value set in Step ST6 in both the first embodiment and the second embodiment is an example of the first search target value. The search target value set in Step ST14 in both the first embodiment and the second embodiment is an example of the second search target value. The operation device 77 used in the first and second embodiments is an example of a control device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ultrasonic bonding apparatus comprising:
    an ultrasonic transducer configured to generate ultrasonic vibration as the ultrasonic transducer receives a voltage;
    a distal-end tool configured to apply a pressure and the ultrasonic vibration to work pieces to be bonded together;
    an ultrasonic horn configured to transmit the pressure and the ultrasonic vibration from the ultrasonic transducer to the distal-end tool; and
    an ultrasonic oscillator comprising an oscillation circuit and a control device, the ultrasonic oscillator applying the voltage oscillated by the oscillation circuit to the ultrasonic transducer; and the control device configured to detect a voltage reflection ratio from the voltage and current supplied from the oscillation circuit and to control the frequency of the voltage generated by the oscillation circuit, thereby to minimize the voltage reflection ratio.

2. The apparatus according to claim 1, wherein the control device controls the oscillation circuit:
    (a) to increase or decrease the frequency of the voltage generated from the oscillation circuit, with respect to an initially set value;
    (b) to set a first search target value, increase the oscillation frequency to the first search target value and detect the increasing voltage reflection ratio, if the voltage reflection ratio detected is smaller than the voltage reflection ratio detected last and increases the oscillation frequency of the voltage, and to set a second search target value, decrease the oscillation frequency to the second search target value and detect the decreasing voltage reflection ratio, if the voltage reflection ratio detected is smaller than the voltage reflection ratio detected last and decreases the oscillation frequency of the voltage;
    (c) to stop updating the first search target value or second search target value if the voltage reflection ratio detected while the oscillation frequency is increasing to the first search target value or decreasing to the second search target value becomes larger than the voltage reflection ratio detected last; and
    (d) to control the oscillation circuit, thereby to decrease the oscillation frequency, if the oscillation frequency increases, to increase the oscillation frequency, if the oscillation frequency decreases, when the output frequency of the oscillation circuit reaches the first search target value or second search target value.

3. The apparatus according to claim 2, wherein the first search target value is obtained by adding a product of an excessive number-of-times and a frequency-step width to the oscillation frequency, the second search target value is obtained by subtracting the product of the excessive number-of-times and frequency-step width from the oscillation frequency, and the product of the excessive number-of-times and frequency-step width becomes smaller as the voltage reflection ratio becomes equal to or smaller than a threshold value.

* * * * *